(12) United States Patent
Apneseth et al.

(10) Patent No.: US 7,450,538 B2
(45) Date of Patent: Nov. 11, 2008

(54) METHOD FOR OPERATING A SYSTEM WITH A MULTIPLICITY OF NODES AND A BASE STATION ACCORDING TO TDMA AND A SYSTEM FOR THIS PURPOSE

(75) Inventors: Christoffer Apneseth, Oslo (NO); Harald Vefling, Borgheim (NO); Jan Endresen, Asker (NO); Dacfey Dzung, Wettingen (CH)

(73) Assignee: ABB Research Ltd, Zurich (CH)

( * ) Notice: Subject to any disclaimer, the term of this patent is extended or adjusted under 35 U.S.C. 154(b) by 400 days.

(21) Appl. No.: 10/516,612

(22) PCT Filed: Aug. 6, 2003

(86) PCT No.: PCT/EP03/08691
§ 371 (c)(1),
(2), (4) Date: Jul. 26, 2005

(87) PCT Pub. No.: WO2004/023419
PCT Pub. Date: Mar. 18, 2004

(65) Prior Publication Data
US 2006/0165026 A1    Jul. 27, 2006

(30) Foreign Application Priority Data
Aug. 17, 2002  (DE) ................................ 102 37 799
Jul. 29, 2003   (DE) ................................ 103 34 873

(51) Int. Cl.
*H04M 3/00*  (2006.01)
*H04M 5/00*  (2006.01)

(52) U.S. Cl. .................. 370/322; 455/41.2; 455/41.3; 455/456.1; 455/556.1; 455/90.1

(58) Field of Classification Search ................ 370/322; 455/41.2, 41.3, 456.1, 556.1, 90.1
See application file for complete search history.

(56) References Cited

U.S. PATENT DOCUMENTS 4,614,945 A    9/1986  Brunius et al.

(Continued)

FOREIGN PATENT DOCUMENTS

DE    39 06 890 A1    9/1990

(Continued)

OTHER PUBLICATIONS

Rappaport, Theodore S., "Wireless Communications, Principles and Practice", Prentice Hall 1996, ISBN 0-1375536-3, pp. 504-513.

(Continued)

*Primary Examiner*—Stephen M D'Agosta
(74) *Attorney, Agent, or Firm*—Buchanan Ingersoll & Rooney PC

(57) ABSTRACT

A method is proposed for operating a system according to TDMA (Time Division Multiple Access) with a multiplicity of wireless sensors and/or actuators as nodes (S.1 ... S.n) and a base station (BS), said system being installed in a machine or installation, such as industrial robots or an automated manufacturing or production unit, whereby cyclical TDMA data transmission blocks are transmitted and each TDMA data transmission block is composed of consecutive time slots. Each time slot is allocated to a specific node. The uplink signals (UL.1 ... UL.n) can be transmitted from the different nodes (S.1 ... S.n) to the base station (BS) simultaneously on two, three or more different frequencies (f1, f2, f3) whereas the. downlink signals (DL) are transmitted from the base station (BSA) to the different nodes (S.1 ... S.n) on only one frequency, which differs from the uplink frequencies. The time slots and the different uplink frequencies of the different nodes are defined once and are thereafter retained.

4 Claims, 1 Drawing Sheet

U.S. PATENT DOCUMENTS

| | | |
|---|---|---|
| 5,734,963 A | 3/1998 | Fitzgerald et al. |
| 5,748,103 A | 5/1998 | Flach et al. |
| 6,404,751 B1 | 6/2002 | Roark et al. |

FOREIGN PATENT DOCUMENTS

| | | |
|---|---|---|
| DE | 43 10 645 A1 | 10/1994 |
| EP | 0 247 790 A2 | 12/1987 |
| EP | 1 022 674 A2 | 7/2000 |
| WO | WO 93/22849 A1 | 11/1993 |
| WO | WO 96/08117 A1 | 3/1996 |

OTHER PUBLICATIONS

Tanebaum, Andres S., "Computer Networks", Third Edition, Prentice Hall, 1996, ISBN 0-13-394248-1, pp. 266-269.

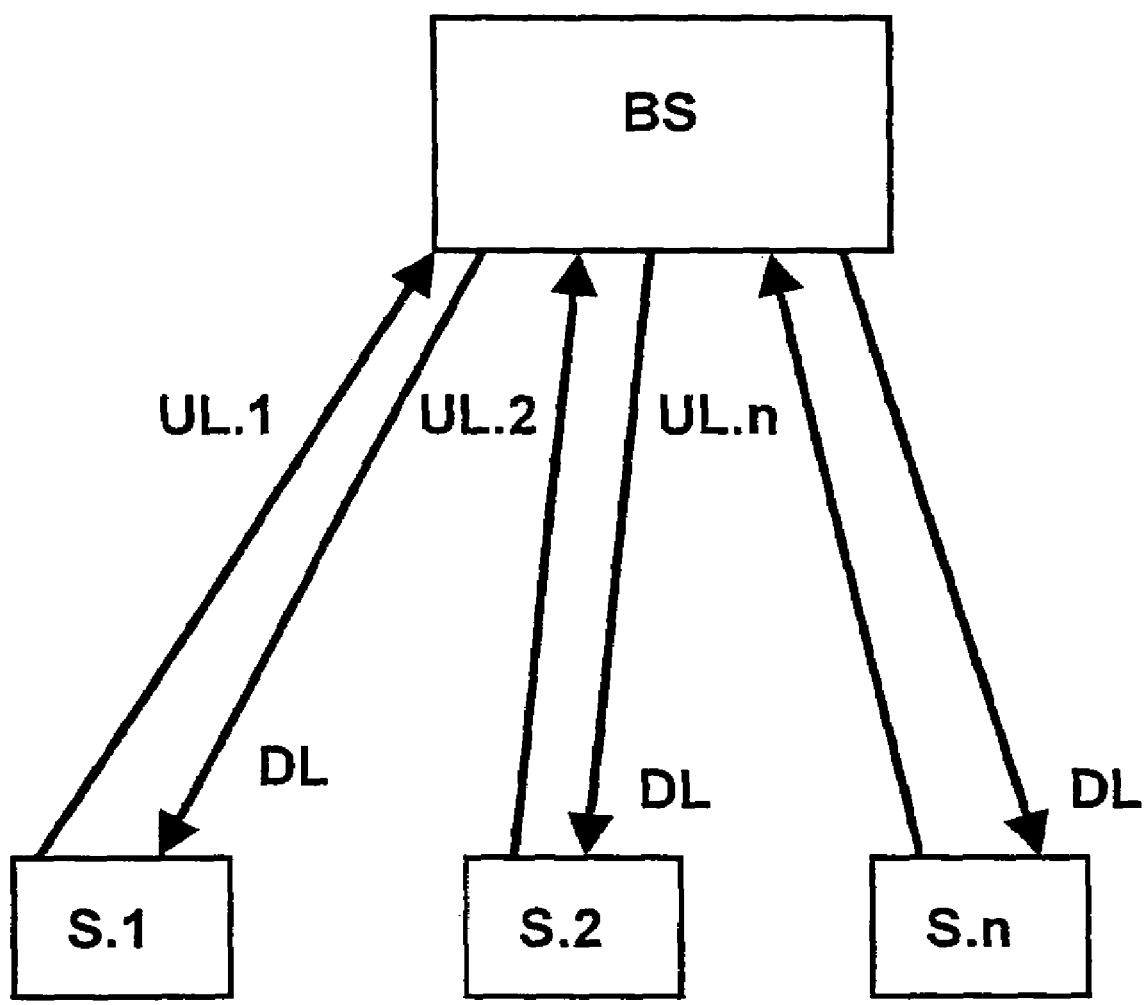

METHOD FOR OPERATING A SYSTEM WITH A MULTIPLICITY OF NODES AND A BASE STATION ACCORDING TO TDMA AND A SYSTEM FOR THIS PURPOSE

The invention relates to a method for operating a system according to TDMA (Time Division Multiple Access) with a multiplicity of wireless sensors and/or actuators as nodes and a base station, said system being installed in a machine or installation, such as industrial robots or an automated manufacturing or production unit, whereby cyclical TDMA data transmission blocks are transmitted and each TDMA data transmission block is composed of consecutive time slots, whereby each time slot is allocated to a specific node. The invention furthermore relates to a system for this purpose.

Proximity switches/proximity sensors, temperature-measuring sensors, pressure-measuring sensors, current-measuring sensors or voltage-measuring sensors or micromechanical, piezoelectric, electrochemical, magnetostrictive, electrostatic or electromagnetic actuators can be used as sensors or actuators.

A system is proposed in DE 199-26 799 A1 for a machine with a multiplicity of wireless proximity sensors, in particular an automated production unit, whereby

- each proximity sensor has at least one secondary winding suitable for absorbing energy from a medium-frequency magnetic field,
- at least one primary winding fed by a medium-frequency oscillator is provided for wireless supply of the proximity sensors with electrical energy,
- each proximity sensor is equipped with a transmitting device which transmits radio signals containing useful sensor information to a central base station connected to a process computer of the machine.

Compared with conventional solutions with a wire/cable connection for electrical power supply and communications, this wireless system does not involve the relatively high cost factor of the wire/cable connections caused by planning, material, installation, documentation and maintenance. No failures due to cable breaks or poor, for example, corroded contacts can occur.

In DE 199 26 562 A1, a method and an arrangement are proposed for the wireless supply of a multiplicity of actuators with electrical energy, an actuator and a primary winding for this purpose, and a system for a machine which has a multiplicity of actuators, whereby the proposed technology in terms of power supply and communications is of a similar type to the technology described above for DE 199 26 799 A1.

TDMA technology (Time Division Multiple Access) is preferably used for the radio transmission, wherein the signals (information) are transmitted from the base station to the actuators or sensors (nodes) as downlink signals, and from the actuators or sensors (nodes) to the base station as uplink signals, in each case in the form of cyclical TDMA data transmission blocks, whereby a specific time slot within a data transmission block is allocated to each sensor/actuator (node). In the prior art, the number of nodes (sensors/actuators) which can communicate with a base station is determined by the number of time slots of a data transmission block, and is therefore limited.

The object of the invention is to indicate a method for operating a system with a multiplicity of nodes and a base station according to TDMA of the aforementioned type in which the number of nodes which can communicate with the base station is increased. A system intended for this purpose will also be indicated.

The object is achieved according to the invention in terms of the method in conjunction with the features of the preamble to Claim 1 in that the uplink signals can be transmitted from the different nodes to the base station simultaneously on two, three or more different frequencies, whereas the downlink signals are transmitted from the base station to the different nodes on only one frequency, which differs from the uplink frequencies, whereby the time slots and the different uplink frequencies of the different nodes are defined once and are thereafter retained.

The object is achieved in terms of the system with a base station and a multiplicity of nodes in that the uplink signals can be transmitted from the different nodes to the base station simultaneously on two, three or more different frequencies, whereas the downlink signals are transmitted from the base station to the different nodes on only one frequency, which differs from the uplink frequencies, whereby the time slots and the different uplink frequencies of the different nodes are defined once and are thereafter retained.

The advantages that can be gained with the invention are, in particular, that the capacity of the system is increased with a multiplicity of nodes and a base station, i.e. the number of possible nodes which can communicate with a base station is doubled if two different uplink frequencies are used, is tripled if three different uplink frequencies are used, etc. The use of additional base stations, which are to be operated with their own downlink frequencies, is avoided, whereby, on the one hand, interferences caused by a plurality of downlink frequencies are advantageously prevented, such interferences generally occurring in systems with a plurality of base stations, and, on the other hand, cost savings are advantageously achieved as a result.

Additional advantages are set out in the description below.

Advantageous designs of the invention are characterized in the subclaims.

BRIEF DESCRIPTION OF THE DRAWINGS

FIG. 1 is a diagram showing a preferred embodiment in accordance with the present invention.

The invention is explained below with reference to the embodiment shown in the drawing. In the single FIGURE, a system is shown with a multiplicity of nodes S.1, S.2 ... S.n (n=any given positive integer), preferably sensors and/or actuators (nodes) and a base station BS. The sensors and/or actuators S.1, S.2 ... S.n are, for example, installed within an installation or attached to a machine, in particular an automated production unit. Sensors/actuators S.1 ... S.n are always referred to below, whereby the individual component may be either a sensor or an actuator. In general, the sensors have a sensor head which detects the sensor environment, with downstream signal evaluation, and the actuators have an actuator unit (for example a compressed-air valve or contactor), and a control unit for this purpose.

The sensors and/or actuators S.1 ... S.n in each case have a communications device containing the radio transmitter and radio receiver required in order to set up in this way wireless communications between the base station BS and the individual sensors/actuators S.1 ... S.n. In a sensor, the processed sensor signal is forwarded to a modulator/coder with a downstream radio transmitter and antenna, where it is transmitted to the base station BS. In an actuator, the control signal transmitted from the base station BS is forwarded via an antenna, a radio receiver and a demodulator/decoder to the control unit.

The base station BS is appropriately connected to a central computer (process computer, storage programmable controller) and has a communications device which receives sensor signals from the sensors and signals indicating the current status of actuators in the form of uplink signals UL.1, UL.2, ... UL.n (uplink="in the upward direction"=from the sensors/actuators to the base station), transmits control signals to activate/deactivate the actuators in the form of downlink signals DL (downlink="in the downward direction"=from the base station to the sensors/actuators), and transmits signals to set specific parameters of the actuators and sensors, similarly in the form of downlink signals DL. The communications device of the base station BS has at least one antenna, to which a radio receiver and a radio transmitter are connected. The signals of the radio receiver are fed to a demodulator/decoder, and a modulator/coder is connected upstream of the radio transmitter.

In the TDMA method, the base station BS transmits a string of consecutive TDMA data transmission blocks or frames for continuous signal transmission in the downward direction, which can be received by every sensor/actuator S.1 ... S.n. A cyclical TDMA data transmission block or frame comprises m (m=any given integer) consecutive time slots. Each time slot is allocated to a specific sensor or actuator S.1 ... S.n.

In order to ensure that the information contained in a time slot is also allocated to the correct actuator, or in order to ensure that a sensor transmits the information which is to be transferred to the base station BS during the correct time slot, each time slot contains a typical synchronization word for exact synchronization between the base station BS on the one hand and sensors/actuators S.1 ... S.n on the other hand. A time slot of a TDMA data transmission block is composed of a synchronization preamble, the symbol sequence of the actual message (payload) and a guard time. The synchronization preamble contains the information required for synchronization between the radio receiver and the radio transmitter.

Although, for example, the sensors generate their messages at random times, the data transmission is adapted to the allocated time slot. A sensor/actuator S.1 ... S.n transmits its data transmission block in the upward direction (uplink signal) at the end of a fixed time span, after it has received the information in the associated time slot in the downward direction (downlink signal).

The receiver of the base station BS can unmistakably identify the relevant radio transmitter, i.e. the relevant sensor/actuator (node) S.1 ... S.n, from the number and frequency allocated to each time slot.

An essential criterion of the invention is that the uplink signals UL.1, UL.2 ... UL.n from the different sensors/actuators S.1 ... S.n are simultaneously transmitted on two, three or more different frequencies, i.e. the data from different sensors/actuators S.1 ... S.n are transmitted simultaneously on two, three or more different frequencies during an uplink time slot. An embodiment for this purpose:

Node S.1 transmits during the first time slot of a data transmission block on the frequency f1,
Node S.2 transmits during the first time slot of a data transmission block on the frequency f2,
Node S.3 transmits during the first time slot of a data transmission block on the frequency f3,
Node S.4 transmits during the second time slot of a data transmission block on the frequency f1,
Node S.5 transmits during the second time slot of a data transmission block on the frequency f2,
Node S.6 transmits during the second time slot of a data transmission block on the frequency f3,
Node S.7 transmits during the third time slot of a data transmission block on the frequency f1,
Node S.8 transmits during the third time slot of a data transmission block 6n the frequency f2,
Node S.9 transmits during the third time slot of a data transmission block on the frequency f3,
Node S.10 transmits during the fourth time slot of a data transmission block on the frequency f1,
Node S.11 transmits during the fourth time slot of a data transmission block on the frequency f2, etc.

The downlink signals DL, on the other hand, are transmitted on one single frequency only, i.e. the data are transmitted simultaneously to two, three or more sensors/actuators S.1 ... S.n during each downlink time slot, this being achieved through suitable data compression. This method offers the advantage that, on the whole, fewer frequencies are used by the system.

The mode of operation of the base station BS correspondingly enables the simultaneous reception of two, three or more different frequencies according to the frequencies of the uplink signals. In the simplest case, this means that two, three or more separate receivers, in each case set to receive a fixed frequency, are provided. Each receiver may have its own receive antenna. Alternatively, a shared receive antenna can be provided for all receivers. Furthermore, specific analogue and/or digital structural components can be jointly implemented for all receive frequencies, whereas other structural components are designed for specific receive frequencies.

The uplink signals are of course only formed and transmitted if the corresponding nodes have to transmit corresponding information, for example sensor data or receive confirmations, i.e. it is of course not absolutely necessary for each node to transmit during each time slot allocated to it.

The uplink time slots are used in a frequency-orthogonal manner (not interfering with one another, non-overlapping), i.e. the different uplink frequencies of the different sensors/actuators are defined in such a way that interferences within the system are avoided as far as possible. The downlink frequency is similarly orthogonal to the uplink frequencies used.

The time slots and the different uplink frequencies of the different nodes are defined once here—during the system configuration—and are thereafter retained.

On the basis and in consideration of the above explanations, it is also possible to operate the system comprising a base station and a multiplicity of nodes for not only the uplink signals but also the downlink signals according to the frequency hopping method in order to thereby increase the quality of the wireless communications.

Frequency hopping FH is a known method in the wireless communications domain for counteracting frequency-selective fading and interferences. The transmission frequency (carrier frequency) hops over a wide frequency band according to a defined frequency hopping frequency sequence which is known to both the transmitter and the receiver. For transmission channels with frequency-dependent transmission conditions and relatively high error rates, it can be ensured by means of frequency hopping that a transmission is performed with sufficient quality and a sufficiently low error rate. In conjunction with error-monitoring methods, for example FEC (Forward Error Correction) or ARQ (Automatic Repeater Request), reliable communications can be achieved in many ways by means of a frequency hopping system.

The basic principles of frequency hopping are known, for example, from J. G. Proakis, Digital Communications, McGraw Hill, 1983, Section 8.3, pages 580-587.

Reference is furthermore made to the technical publication K. Dostert, Powerline Kommunikation, Francis Verlag GmbH Poing, 2000, pages 116-123.

The changeover of the frequencies defined according to the frequency hopping frequency sequence is preferably performed on a frame-by-frame basis. The frequency hopping frequency sequence is generated, for example, on the basis of the timing signals of the base station, which are forwarded to the nodes by means of the downlink signals.

The frequency hopping frequency sequences are advantageously defined in such a way that
- the uplink frequencies and the downlink frequencies use the same overall frequency band,
- the frequency sequences reveal only little correlation,
- all frequencies of the allocated frequency band are used,
- the interval between immediately consecutive frequency hops is as wide as possible,
- the different simultaneously occurring uplink frequencies and the simultaneously occurring downlink frequencies cause no interferences.

However, it is not absolutely necessary for the frequency hopping frequency sequences to satisfy all the criteria specified above.

The invention claimed is:

1. A system with a multiplicity of wireless sensors and/or actuators as nodes (S.1 ... S.n) and a base station (BS), which is installed in a machine or installation, such as industrial robots or an automated manufacturing or production unit,
   a) wherein the sensors have a sensor head which detects a sensor environment and the actuators have an actuator unit and a control unit to detect an actuator environment,
   b) wherein cyclical TDMA data transmission blocks are transmitted and each TDMA data transmission block is composed of consecutive time slots,
   c) wherein each time slot is allocated to a specific node,
   d) wherein the base station receives uplink signals that comprise sensor signals from the sensors and signals indicating the current status of actuators,
   e) wherein the uplink signals (UL.1 ... UL.n) can be transmitted from the different nodes (S.1 ... S.n) to the base station (BS) simultaneously on at least two different frequencies (f1, f2, ... f3),
   f) wherein the downlink signals (DL) are transmitted from the base station (BS) to the different nodes (S.1 ... S.n) on only one frequency, which differs from the uplink frequencies,
   g) wherein the downlink signals comprise control signals to activate/deactivate the actuators and signals to set specific parameters of the actuators sensors,
   h) wherein the time slots and the different uplink frequencies of the different nodes are defined once and are thereafter retained, so that the receiver of the base station (BS) can identify the relevant sensor/actuator node (S.1 ... S.n) from the number and frequency allocated to each time slot.

2. A method for operating a system according to TDMA (Time Division Multiple Access) with a fixed quantity n of wireless sensors and/or actuators as nodes (S.1 ... S.n) and a base station (BS), wherein n is any positive integer, said system being installed in a machine or installation, such as industrial robots or an automated manufacturing or production unit,
   a) wherein the sensors have a sensor head which detects the sensor environment and the actuators have an actuator unit and a control unit to detect the sensor environment,
   b) wherein cyclical TDMA data transmission blocks are transmitted and each TDMA data transmission block is composed of consecutive time slots,
   c) wherein each time slot is allocated to a specific node,
   d) wherein the base station receives uplink signals that comprise sensor signals from the sensors and signals indicating the current status of actuators, 3. The method according to claim 2, wherein the different uplink frequencies of the different sensors and/or actuators (S.1 ... S.n) and the downlink frequency are defined in such a way that interferences are avoided.

4. The method according to claim 2 wherein a frequency hopping method is used.

* * * * *